United States Patent [19]

Hahn et al.

[11] Patent Number: 4,663,867
[45] Date of Patent: May 12, 1987

[54] LOCKING DEVICE FOR WHISLER TYPE ADAPTER

[75] Inventors: Frederick C. Hahn; Larren F. Jones, both of Oloha, Oreg.

[73] Assignee: ESCO Corporation, Portland, Oreg.

[21] Appl. No.: 787,972

[22] Filed: Oct. 2, 1985

[51] Int. Cl.⁴ .............................. E02F 9/28
[52] U.S. Cl. .................. 37/142 A; 403/318; 403/374; 403/379; 299/92
[58] Field of Search ............. 37/142 R, 142 A; 299/92; 403/318, 374, 379

[56] References Cited

U.S. PATENT DOCUMENTS

| 2,635,366 | 4/1953 | Hostetter | 37/142 A |
| 3,019,537 | 2/1962 | Stephenson | 37/142 A |
| 3,041,752 | 7/1962 | Evans | 37/142 A |
| 3,572,785 | 3/1971 | Larson | 37/142 A X |
| 3,722,932 | 3/1973 | Dougall | 37/142 A X |
| 3,773,114 | 11/1973 | Griffin | 37/142 A X |
| 3,832,077 | 8/1974 | Von Mehren | 37/142 A X |
| 3,894,349 | 7/1975 | Moreau | 37/142 A |
| 4,267,653 | 5/1981 | Hahn et al. | 37/142 A |
| 4,271,615 | 6/1981 | Jones | 37/142 A |

Primary Examiner—Edgar S. Burr
Assistant Examiner—Moshe I. Cohen
Attorney, Agent, or Firm—Tilton, Fallon, Lungmus & Chestnut

[57] ABSTRACT

A locking device for a Whisler style adapter, which has upper and lower legs flanking an excavator lip having aligned openings and which are adapted to receive a wedge and C-clamp lock, the lock including a C-clamp and cooperating wedge which are spaced apart, and interposed therebetween is a spring loaded keeper member so as to permit movement of the adapter relative to the lip under an applied load.

2 Claims, 9 Drawing Figures

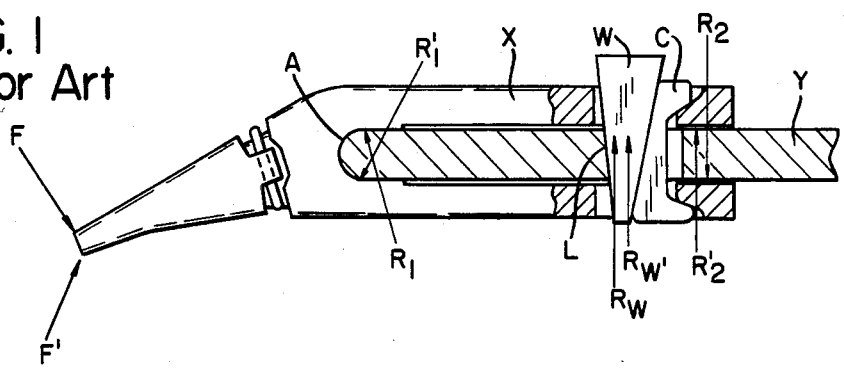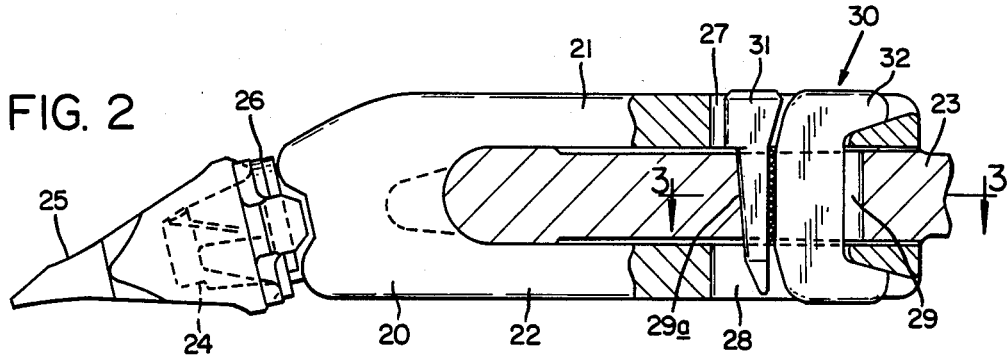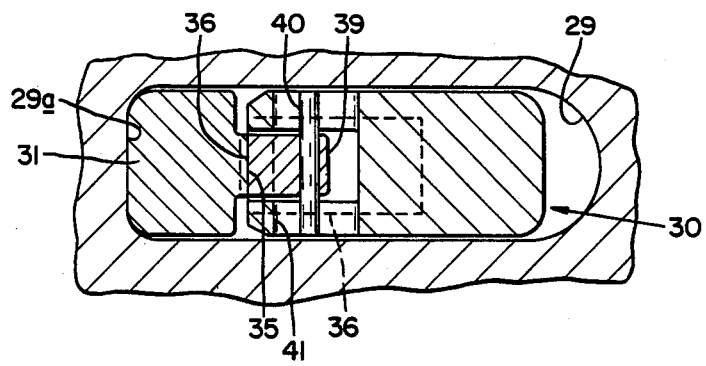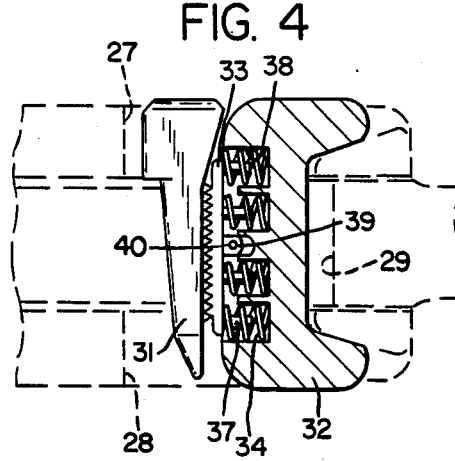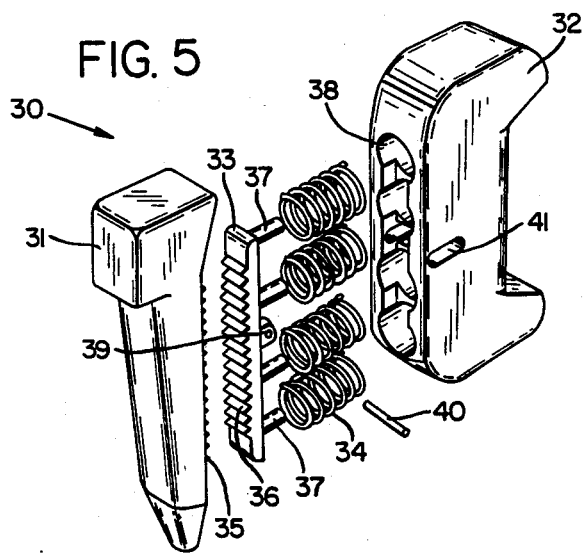

LOCKING DEVICE FOR WHISLER TYPE ADAPTER

This invention relates to a locking device for a Whisler type adapter and, more particularly, to a lock for securing the spaced apart legs of the adapter shank to the lip of an excavator.

BACKGROUND AND SUMMARY OF INVENTION

Prior co-owned patents dealing with locks for Whisler type adapters include U.S. Pat. Nos. 4,267,653 and 4,271,615. Earlier patents dealing with the same subject matter include U.S. Pat. Nos. 3,572,785 and 3,722,932.

The market today is almost totally breakdown maintenance-oriented rather than preventive maintenance-oriented for the simple reason of the economy in money and available staff. Job conditions are as tough as they have ever been and machine power is still at its highest, so the loading on the system is extreme. The Whisler lip system has already been a stellar performer as long as the critical bearing areas were maintained so that the adapter fits tight on the lip. This is no longer the case for the above mentioned reasons and had led to high frequency of adapter leg failures and/or the loss of the C-clamp and wedge sysytem It is almost impossible to predict what happens first, i.e., does the wedge become ejected, then the C-clamp falls out, thereby exposing the adapter leg to a loss of support and failure or total loss without failure, or does the adapter leg fail and then the lock sytem eject as a secondary action? We are certain that wedges do eject and C-clamps are lost, even though the two are welded to each other, so this can be considered a primary factor in the failure and/or subsequent loss of the adapters.

In our opinion, this occurs because of the looseness in the fit between the adapter and the lip. The primary bearing at the forward edge of the lip where it bears in the adapter crotch, with secondary bearing importance existing in the back of the legs, where bearing is required for a proper C-Clamp and wedge assembly to operate properly.

We have overcome this problem by allowing the entire adapter system to move under high stress static or shock loads rather than just the areas forward of the C-clamp and wedge in the case of the conventional wedge type connection. This allows for more balanced stress distribution, hence producing a stronger overall assembly. Additionally, the system is easy to install and remove, as opposed to existing wedge type of arrangements, thereby enhancing the customer service advantage and safety as well. Finally, the lock system overcomes the vertical forces that always exist in any wedge type C-clamp and wedge system that are always tending to eject the wedge from assembly. More particularly, the invention makes use of a C-clamp member and a wedge member with spring means interposed between the two members and constituting the only bearing contact between the two members when the adapter is not under load.

Where the wedge is in assembly with the C-clamp, this combination in assembly with the back of the Whisler adapter legs is in a totaly constrained, nearly non-deflectable capacity. This puts considerable extra loading on the legs of the adapter forward of the wedge, as the adapter moves in line with the description above.

Based on our theory on adapter movement on the lip, we conceived an improved design Whisler-style adapter system that is intended to live under the environment of a loose fitting system due to wear and tear of the bearing areas, because this appears to be the case more than 90% of the time these days.

Springs in the past have not been widely used as locking devices in excavating teeth. Illustrative of what has been done is U.S. Pat. No. 3,832,077, which shows a spring in connection with a locking pin for securing the point to the adapter. Although the adapter illustrated is of the Whisler type, it does not use a C-clamp and wedge but rather is intended to be secured to the lip by means of bolts. Bolts have long been avoided for securing adapters to lips of excavating equipment because of the difficulty of disassembly—the threads becoming worn or filling with compacted material.

The invention is described in conjunction with the accompanying drawing, in which FIG. 1 is a side elevational view, partially in section, in essentially schematic form, illustrating the operation of the prior art locking device;

FIG. 2 is a side elevational view, partially in section, of a locking arrangement according to the instant invention;

FIG. 3 is a fragmentary enlarged elevational view taken along the sight line 3—3 of FIG. 2;

FIG. 4 is an enlarged fragmentary side elevational view, partially in section, of one embodiment of the inventive locking device;

FIG. 5 is an exploded perspective view of the locking device of FIG. 4;

DETAILED DESCRIPTION

Figure 6:
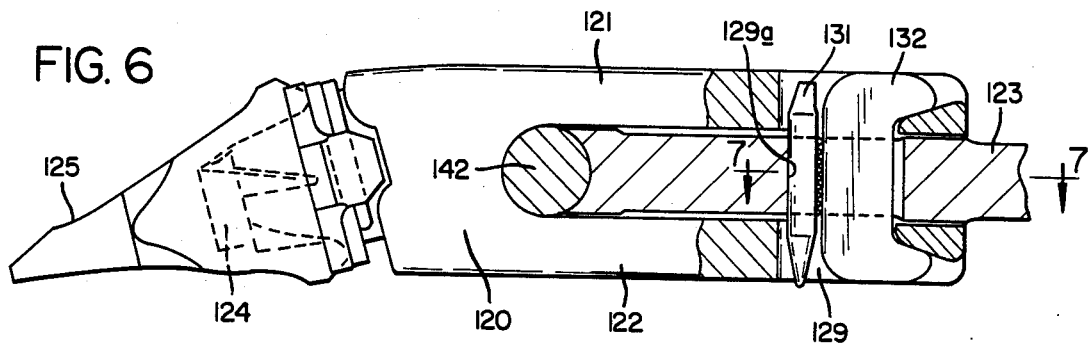
FIG. 6 is a fragmentary side elevational view, partially in section, of a modified form of the invention.

Referring now to the drawing and, in particular to FIG. 1, a conventional prior art locking device is seen as applied to a Whisler adapter X mounted on the lip Y of an excavator, viz., dragline bucket, shovel dipper, etc. What follows is a vector analysis based upon, in the first instance, a load vector F, which can exist at any general angle relative to the face of the tooth or centerline of the adapter nose, depending upon the type of material and the position of the excavator and the loading cycle.

When the lip bearing pad wears from the consistent hammering that is attendant to force F, clearance develops in zone A that we believe allows the top adapter leg to stretch in tension and the bottom leg to buckle in compression—in both cases immediately in front of the wedge and C-clamp system. We believe that the resultant reaction that is applied to the C-clamp C and wedge W causes an ejection force, as indicated by Rw, that causes the wedge to eject even though it is optionally welded to the C-clamp, followed by the loss of the C-clamp, and then unnatural loading or loss of the adapter occurs. The ejection force is caused by the inclined reactions developed either due to the taper between the C-clamp and the wedge, as shown in this illustration, or due to a similar taper existing between the key slot in the lip and the forward edge of the wedge, as indicated in zone L. Whether the taper exists between the wedge and the C-clamp, or the lip or the wedge, is a matter of designer's choice and varies from lip to lip. In any event, the tapered surface between the wedge and C-clamp, with or without a tapered slot in the lip, causes the ejection from force Rw.

Now, if instead of external top load F, we encountered a bottom load F', the buckling action would occur in the top leg and the tension load and stretching would occur in the bottom leg. The ejection force Rw would still be in the direction indicated, even under the influence of the F' load, because the taper between the wedge W and the C-clamp C and/or the wedge W and the key slot of the lip are positive or open in that direction for ease of installation from the top of the lip in the bucket. If we would choose to invert the C-clamp and wedge and thus endure the extra labor of installation from the bottom bucket, the ejection force would always be down, regardless of where the face was applied—F or F'. The cycling of force vectors, F to F' to F, is typical to the fluttering action in the loading stroke of the frontend loader or hydraulic shovel.

Referring now to FIG. 2, the structure embodying the invention includes a Whisler type adapter 20, having an upper leg 21 and a lower leg 22 flanking the excavator lip 23. The adapter is equipped with an integral, forwardly projecting nose 24 on which a point 25 is removably mounted and releasably locked in place by means of a point lock mechanism 26. This much is conventional.

Also generally conventional are the openings 27 and 28 in the upper and lower adapter legs 21 and 22, respectively—and, in a general way, is a vertically extending opening 29 provided in the adapter lip for the receipt of a locking device. The locking device is generally designated 30 and can be seen in greater detail in FIGS. 3-5.

The inventive locking device 30 includes a wedge member 31—now referring to FIG. 5—a C-clamp member 32 and a moveable keeper member 33, which is loaded by a plurality of springs 34. There is no taper between the mating faces of the wedge 31 and C-clamp 32 so that there is no ejection force operating on the wedge from their influence.

In operation, the locking device 30 is able to move freely as the adapter moves so there is no constraint behind the C-clamp and wedge assembly and the legs can move in more or less unison from the effects of the varying forces F and F'.

In the embodiment of the invention illustrated in FIGS. 2-5, the wedge member 31 is equipped with a ratchet 35 adapted to engage and mate with the ratchet portion 36 provided on the keeper member 33. In addition, the keeper member 33 is equipped with a plurality of rearwardly extending posts 37 on which the springs 34 are mounted. The springs 34 are further supported in counter sunk openings 38 provided in the forward face of the C-clamp 32.

To further align the spring means, including the keeper member 33 and the springs 34, we provide a lug 39 on the rearwardly disposed surface of the keeper member 33, which is appetured to receive a pin 40. In turn, the pin 40 is slidably mounted within a horizontally extending slot 41 provided in the sidewalls of the C-clamp 32.

It will be appreciated that the pin 40, by being received in the opening in the lug 39 and also in the slots 41, serves to guide the keeper member 33 and maintain the forwardly facing surfaces of the keeper member—the surface equipped with the ratchet 36 in bearing contact with the rearwardly facing surface of the wedge 31—and the surface equipped with the ratchet 35. Also, the posts 37 tend to restrain the springs 34 from undesired movement as the adapter 30 moves and flexes relative to the lip 23.

It will be appreciated that the instant invention involves a system that flexes with the movement of the Whisler adapter about the lip and, for the first time, allowing the adapter to move rather than utilize a solidly locked C-clamp and wedge system which is intended to keep the adapter tight on the lip.

Figure 7:
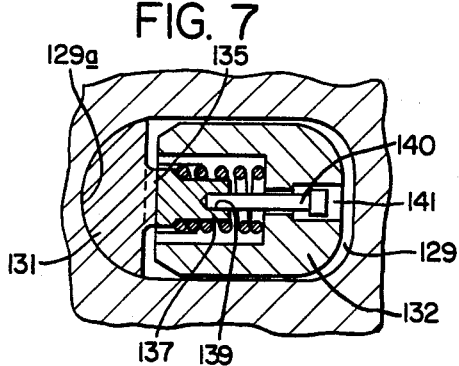
FIG. 7 is an enlarged fragmentary sectional view taken along the sight line 7—7 of FIG. 6.
Figure 8:
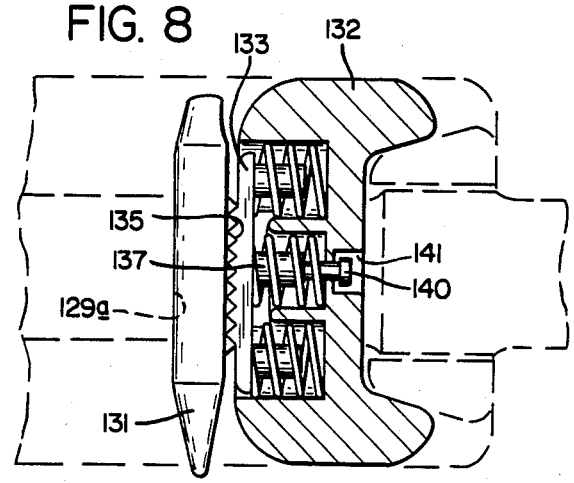
FIG. 8 is an enlarged side elevational view, partially in section, of the locking device of FIG. 6 and 7.
Figure 9:
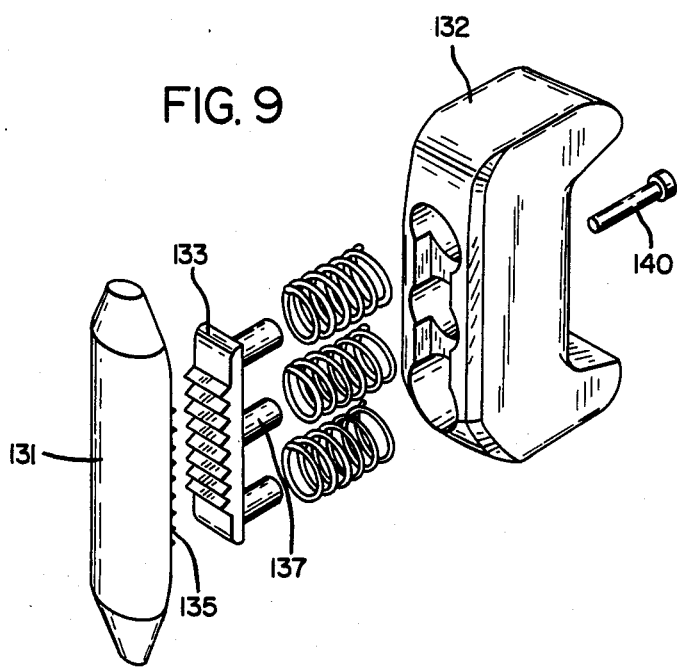
FIG. 9 is an exploded perspective view of the locking device of FIGS. 6–8.

A second embodiment of the invention is seen in FIGS. 6-9, where like numerals are employed to designate parts similar to those of the FIGS. 2-5 embodiment, but with the addition of 100. So, the adapter is designated 120 and has a nose of 124 on which the excavating tooth point 125 is mounted. The adapter upper and lower legs 121 and 122 flank the excavator lip 123.

In this case, the lip, at its forward end, has been modified by the inclusion of a cylindrical bar 142. This bar facilitates the rocking, flexing movement of the Whisler style adapter relative to the lip 123.

Another difference in this embodiment from that of FIGS. 2-5 is in the character of the keeper member 131. We still refer to it as a wedge because the art is accustomed to designate the companion to the C-clamp as being the wedge, even though there is no wedging function performed. Here, the forward and rearward vertically extending surfaces are substantially parallel, the rearwardly facing surface again being equipped with horizontal serrations or a ratchet, as at 135. In this embodiment, the lip 123 has a vertically extending wall 129a at the forward end of the opening 129. This is in contrast to the sloping forward wall at 29a in FIG. 2. As indicated previously, the shape of the opening in prior lips was a matter of design choice—some designers preferring to introduce a taper at 29a.

Another difference between this embodiment and that previously described resides in the nature of the guide means for the keeper member 131. In this instance, we provide a forwardly extending pin 140, which extends through an opening 141 in the C-clamp member 132. This is received within an axially extending opening 139 provided in the center post 137.

While in the foregoing specification a detailed description of the invention has been set down for the purpose of illustration, many variations in the details herein given may be made by those skilled in the art without departing from the spirit and scope of the invention.

We claim:

1. In an excavator, a lip adapted to extend generally horizontally during digging, an adapter having upper and lower legs flanking said lip and having a nose portion projecting forwardly of said lip during digging, vertically aligned openings in said legs and lip for receipt of a locking device, said leg openings being spaced from the rear ends of said legs, a locking device removably mounted in said openings and including vertically extending, spaced apart wedge and C-clamp members, said locking device further including means providing a rocking action of said adapter relative to said lip, said means consisting of a plurality of springs interposed between said wedge and C-clamp members said springs constituting substantially the only bearing contact therebetween when said adapter is not under load said rocking action eliminating the concentration of tension and compression forces in said legs forward of said leg openings.

2. The structure of claim 1 further including a keeper in engagement with said wedge member and said springs said keeper and wedge member having ratchet-equipped confronting surfaces.

* * * * *